Figure 1:
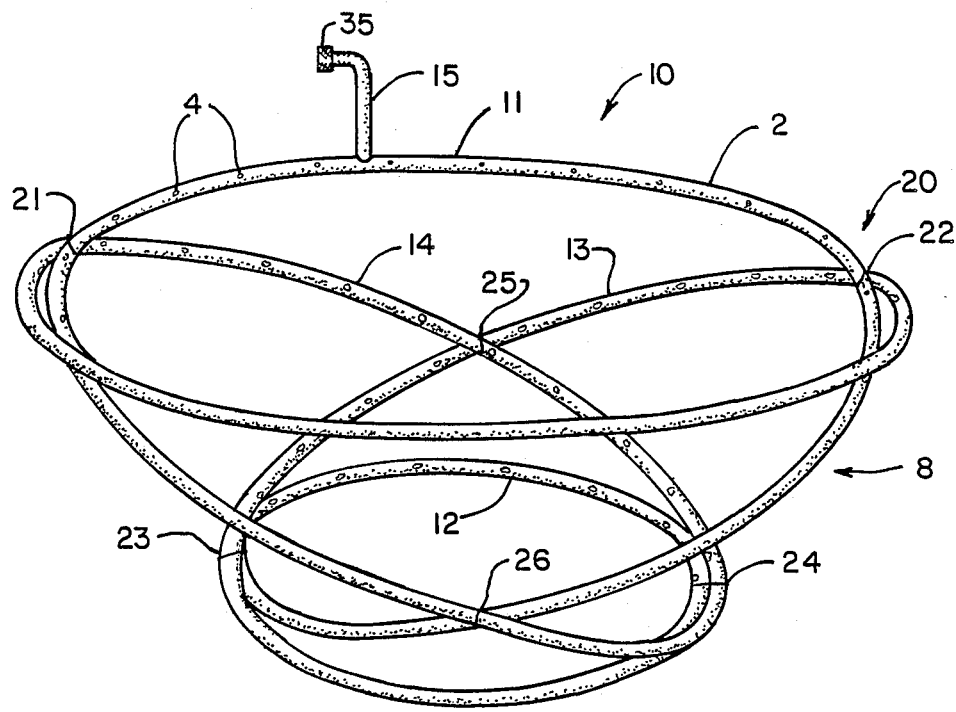
Figure 2:
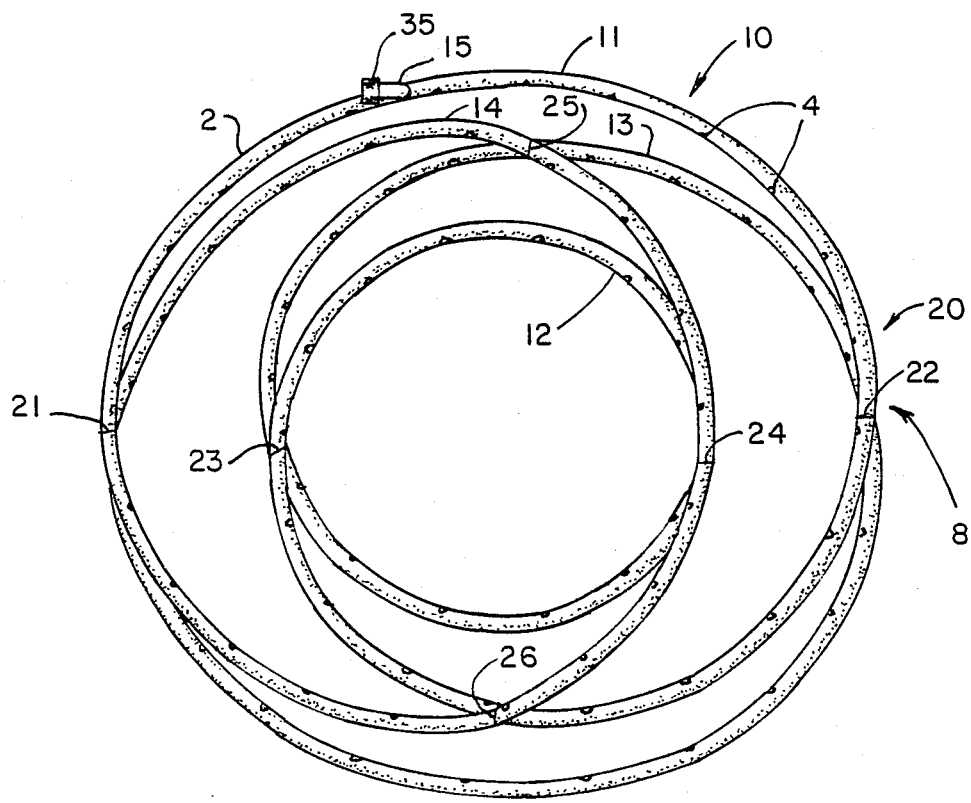

United States Patent [19]

O'Hara, Jr.

[11] Patent Number: 4,843,757
[45] Date of Patent: Jul. 4, 1989

[54] ROOT BALL WATERING DEVICE

[76] Inventor: James C. O'Hara, Jr., 11307 Meadowside Dr., St. Louis, Mo. 63146

[21] Appl. No.: 126,765

[22] Filed: Nov. 30, 1987

Related U.S. Application Data

[63] Continuation of Ser. No. 853,648, Apr. 18, 1986, abandoned.

[51] Int. Cl.⁴ .............................................. A01G 29/00
[52] U.S. Cl. .......................................... 47/48.5; 47/76
[58] Field of Search ....................... 47/48.5, 76, 78, 79

[56] References Cited

U.S. PATENT DOCUMENTS

| | | | |
|---|---|---|---|
| 584,886 | 6/1897 | Mead | 47/48.5 X |
| 2,105,800 | 1/1938 | Watkins | 47/48.5 X |
| 3,109,258 | 11/1963 | Jensen | 47/48.5 |
| 3,316,675 | 5/1967 | Cartwright, Jr. | 47/76 |
| 3,324,591 | 6/1967 | Bergstein | 47/78 |
| 4,257,191 | 3/1981 | Holter et al. | 47/48.5 |

Primary Examiner—Robert A. Hafer
Assistant Examiner—Kevin G. Rooney
Attorney, Agent, or Firm—Henry W. Cummings

[57] ABSTRACT

In accordance with the present invention a piece of perforated tubing is formed into a series of loops which define a generally truncated shape with at least one large diameter loop at the top and at least one smaller diameter loop located below the top loop. The tubing has sufficient strength and is wound into a contour shape to fit around the root ball of a tree or shrub harvested from a nursery. The perforated tubing includes a plurality of longitudinally spaced openings of a size sufficient to supply water and/or fertilizer to the root ball after the root ball is planted in the ground. Means are provided to maintain the tubing in the truncated shape. In one embodiment this shape comprises a series of specially fixed wound loops. In one embodiment this comprises formed loops with six connection points where the loops contact one another. Means are provided for supplying water and/or fertilizer to the tubing after the root ball has been planted. This may comprise an extension extending from the tubing to point at ground level where a suitable hose connection is provided to supply water and/or fertilizer.

12 Claims, 2 Drawing Sheets

ROOT BALL WATERING DEVICE

This is a continuation of application Ser. No. 853,648 now abandoned filed Apr. 18, 1986.

SUMMARY OF THE INVENTION

In accordance with the present invention a piece of perforated tubing is formed into a series of loops which define a gererally truncated shape with a least one large diameter loop at the top and at least one smaller diameter loop located below the top loop. The tubing has sufficient strength and is wound into a contour shape to fit around the root ball of a tree or shrub harvested from a nursery. The perforated tubing includes a plurality of longitudinally spaced openings of a size sufficient to supply water and/or fertilizer to the root ball after the root ball is planted in the ground. Means are provided to maintain the tubing in the truncated shape. In one embodiment this shape comprises a series specially fixed wound loops. In one embodiment this comprises formed loops with six connection points where the loops contact one another. Means are provided for supplying water and/or fertilizer to the tubing after the root ball has been planted. This may comprise an extension extending from the tubing to point at ground level where a suitable hose connection is provided to supply water and/or fertilizer.

In one embodiment at the connection points, means are provided for mounting the multi-loop shape. This may comprise strings, straps, stitches, threads or mechanical fasteners to maintain the adjacent loop portion in engagement.

In another embodiment the loops which define the truncated shape are attached to burlap or other flexible material which form the root ball with fastening means such as thread, stitching or mechanical fasteners at selected points along the burlap conduit interface.

The loops are moveable into a retracted collapsed position for transportation and/or storage of the loops without the root ball.

BACKGROUND

When a young tree or shrub is harvested from a tree nursery the roots are usually contained within a piece of burlap material which is connected at the top of the roots with suitable clips or fasteners to hold the roots or root ball in place.

In application Ser. No. 747,261 filed June 21, 1985 a water basket for watering or fertilizing tree and shrub roots is disclosed including at least one and preferably a plurality of hollow, relatively rigid circular rings to apply water and/or fertilizer to the root ball through openings provided in the ring, and to support the root ball during transportation of the root ball prior to planting. Embodiments including a plurality of rings are preferred because of more efficient watering and fertilizing of the root ball, and better support of the root ball during transportation.

In constructing a unit including a plurality of rings joined together by vertical support members at least one of the vertical members must carry water between the rings.

Fabrication of the arrangement with a plurality of rings was found to be more difficult and expensive than had originally been expected.

DRAWINGS

FIG. (1) is a schematic perspective view of the water loops of the present invention with the root ball removed for clarity and illustrating one embodiment of a suitable winding arrangement which results in the truncated shape to provide some support for the root ball during transportation from the nursery to the planting site and which provides effective watering and/or fertilization after the root ball is planted.

FIG. (2) is a plan view illustrating the collapsed or retracted position of the loops which can be used for transportation and/or storage of the water loops before they are utilized in connection with a root ball.

Figure 3:
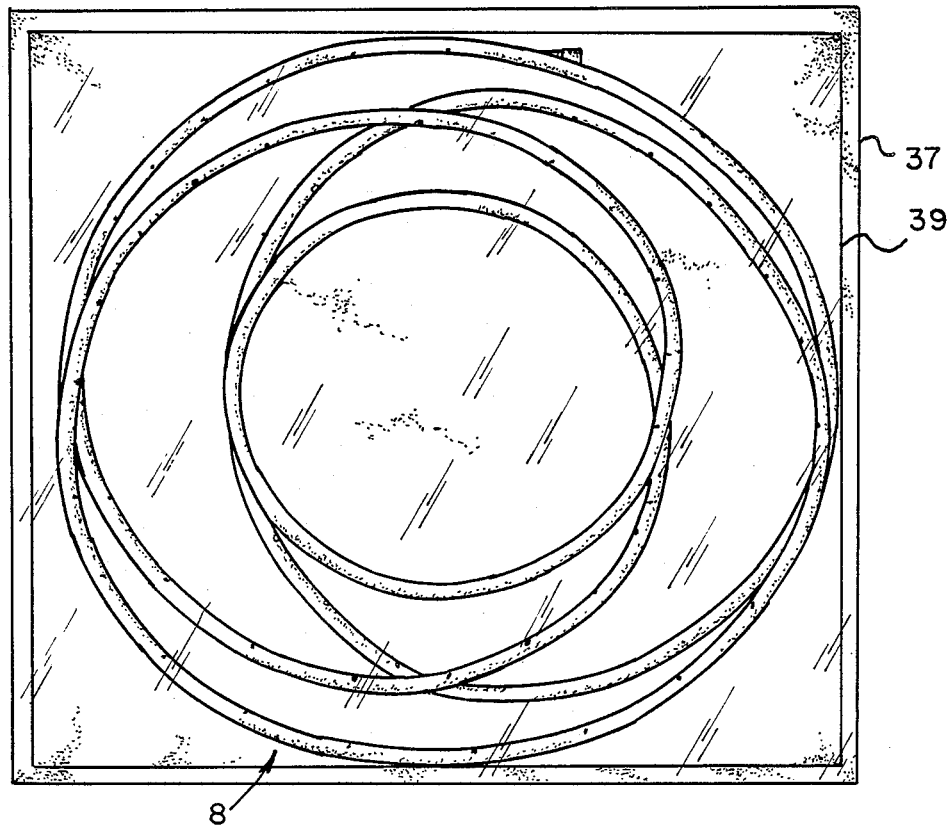
Figure 4:
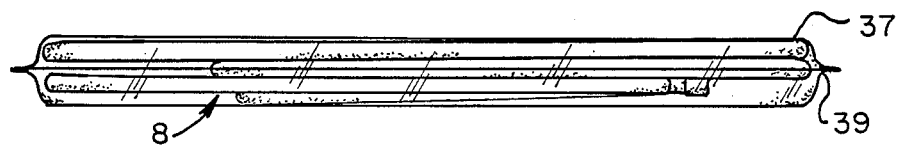

FIG. 3 is an additional view of the watering device of the present invention in retracted position. FIG. 4 is a side elevation view of FIG. 3.

DECRIPTION OF PREFERRED EMBODIMENTS

In Figure (1) the water loop assembly of the present invention is illustrated at (10) comprising a piece of hollow tubing (2). The hollow tubing includes a plurality of longitudinally spaced openings (4) provided for the purpose of providing water or fertilizer to the root ball after the tree is planted.

The tubing is preferably relatively rigid, and may be formed from polyvinyl cloride, ADS, polyethylene, polypropylene or other plastic tubing or fiberglass suitable for molding, thermoforming, extruding or casting. The size of the openings (4) will vary for different applications. However, opening sizes of 1/32 of an inch to ¼ of an inch are contemplated for many applications. Spacing as close as to ¼ of an inch may be used for some applications, in other cases spacing up to 12 inches may be appropriate.

The tubing (2) is formed into a series of loops (8) to define a truncated shape. Loop (11) extends from point (21) outwardly to point (22) and downwardly into a second loop (12) at point (23). Loop (12) extends from point (23) around the base for 360 degrees into a third loop (13) at point (23). Loop (13) extends from point (23) upwardly to point (22) and outwardly into a fourth loop (14) at point (21). Loop (14) extends from point (21) downwardly to point (24) and upwardly into the first loop at point (21).

A suitable conduit portion which includes a connection for providing means to connect a water source is provided at (35).

The present invention further includes means for maintaining the tubing in the truncated shape. This means indicated generally at (20) comprised of connections at point (21), (22), (23), (24), (25), and (26) where the loops cross each other or are tangent to each other. The connecting means may comprise of stitches, straps, or other mechanical fasteners to maintain the respective portions of the loops in their respective positions.

The mechanical fasteners (20) must have sufficient strength to withstand the weight of the ball as the root ball is handled between the nursery where it is harvested and where it is planted in the ground. Gradually the burlap or other material surrounding the ball at the nursery will rot in the ground. However, the flexible tubing is made of sufficiently non-corrosive material that it will last during at least the first several years that the tree or shrub is planted. Therefore, during these initial years of formation the tree or shrub may be watered or fertilized on a regular basis by appropriate connection of the source of the water or fertilizer to the connection (35).

The perforated tubing (2) should have sufficient strength and rigidity that an attendant may lift the entire ball by grasping the upper portion of the tubing (14).

In order to provide efficient support it is preferred that the tubing be formed into a structure including smaller diameter rings at the bottom and larger rings at the top. Thus it is preferred that the tubing follow a truncated ring structure.

This provides an arrangement whereby the root ball is effectively supported in transit, and whereby the root ball is effectively watered or fertilized after it is planted in the ground. It is preferred to provide the water loop truncated shape illustrated effective support for the root ball and to provide effective relatively uniform distribution after the tree or shrub is planted.

FIGS. 3 and 4 illustrate the transportation and storage position within a conventional clear plastic envelope 37 having a seam 39.

What is claimed is:

1. A tree and/or shrub root ball watering system system comprising a continuous strand or perforated tubing in a series of 360 degree intersecting segments; said tubing being movable between a relatively flat, retracted position for transportation and storage; and an extended position for watering of trees and shrub roots; in said extended position said segments defining a generally truncated shape; each segment comprising a portion which is substantially diagonal when said tubing is in said extended position; each segment being held in position to form said truncated shape by fastening means located at fastening points at the intersections of said diagonal segments; each said 360 degree segment beginning and ending at a fastening point; and each said segment containing at least two fastening points.

2. A watering system according to claim 1 including: A set of four loops.

3. A watering system according to claim 2 formed into a truncated cone shape.

4. A watering system according to claim 1 formed by molding the tubing into the loop shape.

5. A watering system according to claim 4 formed from porous tubing.

6. A watering system according to claim 5 including means to connect a source of water to the system.

7. A system according to claim 1 including formed loops with six connection points where the loops contact one another.

8. A system according to claim 1 including a means for supplying water and/or fertilizer to the tubing after the root ball has been planted.

9. A system according to claim 8 which comprises an extension extending from the tubing to point at ground level where a suitable hose connection is provided to supply water and/or fertilizer.

10. A system including according to claim 9 which comprises strings, straps, stitches, threads, or mechanical fasteners to maintain the adjacent loop portion in engagement.

11. A system according to claim 1 including means provided for maintaining the multi-loop shape.

12. A system according to claim 1 wherein the loops which define the truncated shape are attached to burlap or other flexible material which form the root ball with fastening means.

* * * * *